United States Patent [19]

Vazquez-Cuervo et al.

[11] 4,288,726
[45] Sep. 8, 1981

[54] PERMANENT MAGNET MOTOR CONTROL SYSTEM

[75] Inventors: Alfonso Vazquez-Cuervo; Frederick T. Richards; Daniel V. Bafunno, all of Warren; George Papacostas, Youngstown, all of Ohio

[73] Assignee: General Motors Corporation, Detroit, Mich.

[21] Appl. No.: 135,483

[22] Filed: Mar. 31, 1980

[51] Int. Cl.³ .............................................. H02P 1/54
[52] U.S. Cl. ........................................ 318/54; 318/34; 318/51; 318/65
[58] Field of Search ............ 318/51, 54, 65, 280, 318/293, 300, 34; 307/138; 200/1 V

[56] References Cited

U.S. PATENT DOCUMENTS

| | | | |
|---|---|---|---|
| 2,683,246 | 7/1958 | Priban | 318/51 X |
| 3,147,423 | 9/1964 | Du Rocher | 318/280 |
| 3,305,718 | 2/1967 | Waldron | 318/293 X |
| 3,629,606 | 12/1971 | Mathey | 318/293 X |

Primary Examiner—Ulysses Weldon
Attorney, Agent, or Firm—Albert F. Duke

[57] ABSTRACT

A plurality of permanent magnet DC motors are grouped into two banks. One side of each motor in one bank is connected to a first common supply conductor while one side of each motor in the other bank is connected to a second common supply conductor. Independently operable switches are provided for connecting the other sides of respective ones of the motors in the first and second banks to a third common supply conductor. Three additional power switches are provided for reversibly connecting a source of potential across either bank of motors. By proper switch selection one or more motors in either of the banks may be operated in a selected direction of rotation.

6 Claims, 3 Drawing Figures

PERMANENT MAGNET MOTOR CONTROL SYSTEM

FIELD OF THE INVENTION

This invention relates to systems for controlling a plurality of permanent magnet motors and, more particularly, to a switching circuit for selectively rotating one or more of a plurality of permanent magnet motors in either of two directions utilizing a minimum of power switching means.

BACKGROUND OF THE INVENTION

DC motors of the permanent magnet type are presently utilized in automobiles for implementing the power assist function for vehicle seats, windows and door locks. In some vehicles ten or more of these permanent magnet motors may be employed. In conventional systems each motor requires two power switches, such as relays, in order for each motor to be operated independently of the other. Thus, in a system comprising ten motors, a total of twenty such relays would be required. Considerable savings in both cost, weight and space can be achieved by reducing the number of power switches required if certain limitations in terms of simultaneous motor operation are acceptable.

SUMMARY OF THE INVENTION

With the foregoing in mind, it is an object of the present invention to provide a circuit for controlling a plurality of reversible electric motors which utilizes the concept of multiplexed or shared switching to achieve a reduction in the total number of power switches necessary to control the direction of rotation of a particular motor.

Other objects of the present invention will be more apparent from the following detailed description which should be read in conjunction with the drawings, in which:

DESCRIPTION OF THE PREFERRED EMBODIMENTS

In accordance with the present invention, a plurality of permanent magnet DC motors are grouped into two banks. One side of each motor in one bank is connected to a first common supply conductor while one side of each motor in the other bank is connected to a second common supply conductor. Independently operable switches are provided for connecting the other sides of respective ones of the motors in the first and second banks to a third common supply conductor. Three additional power switches are provided for reversibly connecting a source of potential across either bank of motors. By proper switch selection one or more motors in either of the banks may be operated in a selected direction of rotation.

Figure 1:
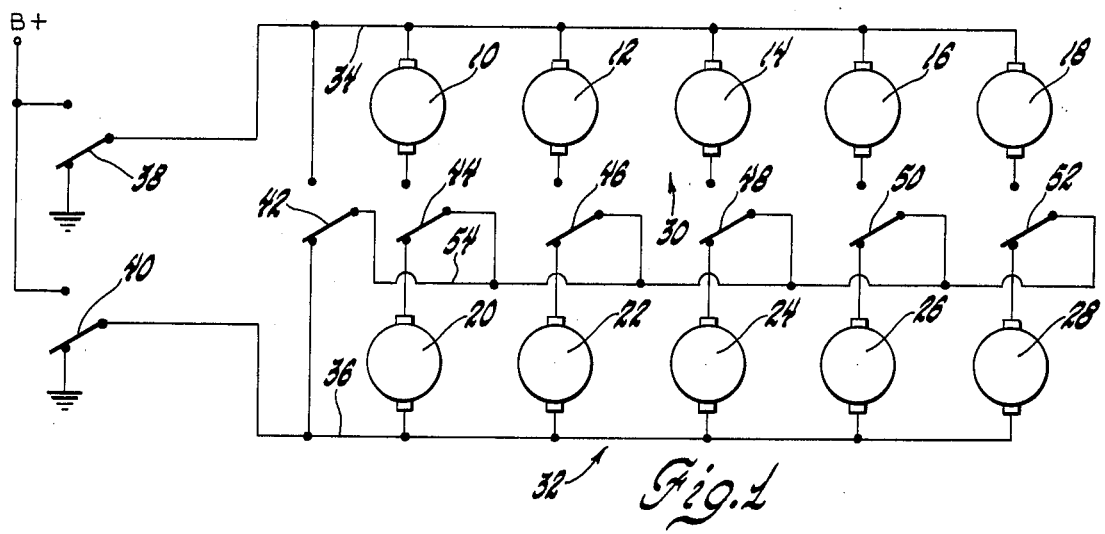
FIGS. 1 and 2 are alternative embodiments of the relay switching circuit of the present invention.

Referring now to the drawings and initially to FIG. 1, a plurality of permanent magnet DC motors 10 through 28 are arranged in two banks generally designated 30 and 32. One energizing terminal of each of the motors 10 through 18 is connected with a common supply terminal 34 while one energizing terminal of each of the motors 20 through 28 are connected with a common supply conductor 36. A plurality of single pole/double throw relay contacts include respective armatures 38-52 which are movable from the normal position shown to a position engaging the normally open contact in response to energization of an associated relay coil (not shown). The armatures 38 and 40 normally connect the conductors 34 and 36, respectively, to ground potential but are actuable to engage its normally open contact which is connected to the positive terminal, designated B+, of a direct current potential source such as the battery of an automobile. The negative terminal of the battery is connected to ground potential. Each of the armatures 42-52 are connected with a third common supply terminal 54 which is normally connected to the armature 40 through armature 42 but is adapted to be connected to the armature 38 upon actuation of the armature 42 to a position engaging its associated normally open contact. The armatures 44-52 normally connect the other side of the motors 20-28 to the conductor 54 but are selectively actuable by energization of their associated relay coil to connect the other side of the motors 10-18 to the conductor 54.

The position of the armature 42 determines which of the banks 30 and 32 is selected for operation while the position of the armatures 44-52 determine which one or more of the motors within the selected bank will be operated. The position of the armatures 38 and 40 determine the direction of rotation of the selected motor or motors. For example, with the armature 42 in the position shown the bank 30 is selected. Accordingly, if the armatures 38 and 44 are actuated, the motor 10 will be driven in one direction, for example clockwise, while if the armatures 40 and 44 are actuated the motor 10 will rotate in a counterclockwise direction. To operate the motor 20 in a clockwise direction the armatures 38, 42 and 46 through 52 are actuated.

Figure 2:
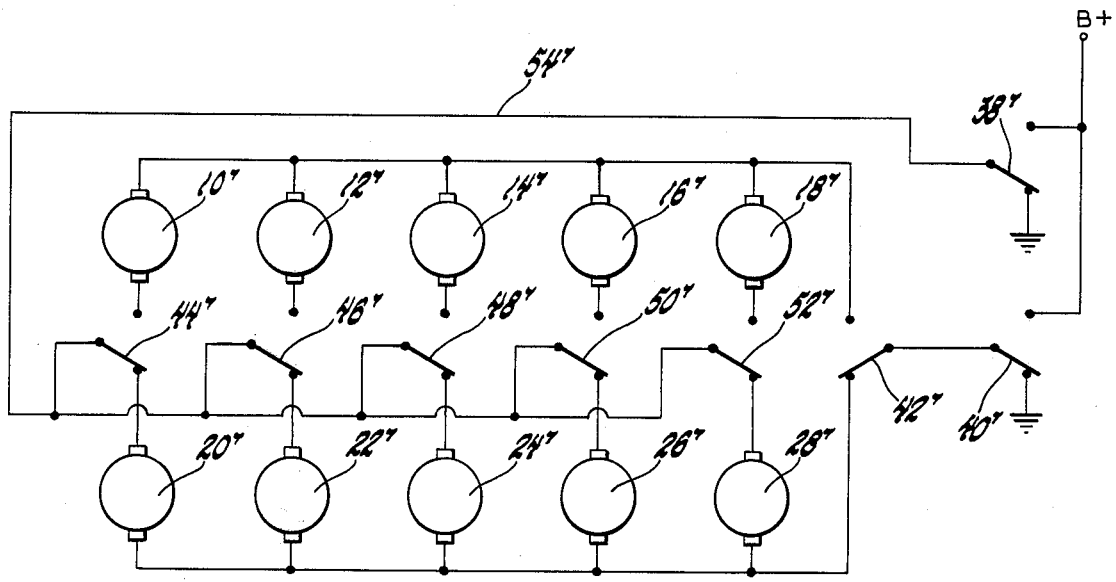

The FIG. 2 embodiment is logically equivalent to the FIG. 1 embodiment but allows minimization of the relay package costs in that four identical two coil packages can be utilized. The FIG. 1 embodiment is designed to minimize the wiring harness costs by reducing the number of required connections. In FIG. 2, the line 54' is connected directly to the armature 38' while the armature 42' is connected directly to the armature 40'. It will be understood that if desired the single pole/double throw armature arrangement depicted at 38 and 40 could be replaced by a double pole/double throw armature arrangement wherein one pole is normally connected to ground and the other pole is normally connected to B+.

Figure 3:
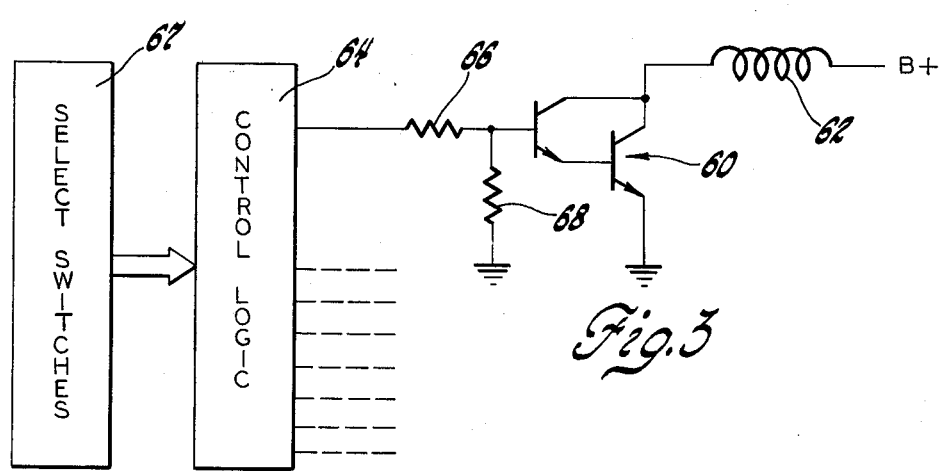
FIG. 3 shows typical actuating circuitry for controlling each of the relays in the FIGS. 1 and 2 embodiments.

Referring now to FIG. 3, the relay energizing circuitry controlling the armatures 38-52 is identical for each relay. One circuit is shown in FIG. 3 and comprises an amplifier 60 which energizes a relay 62 in response to a high logic level output from control logic 64. The amplifier 60 is connected to the logic 64 through a current limiting resistor 66 and to ground through a pull-down resistor 68. Two position select switches 67, one associated with each of the ten motors 10-28, provide inputs to logic 64. Each of the ten switches, respectively, select the motor to be energized and its direction of rotation. The logic 64 responds to the input switch positions to provide control signals to energize the appropriate relay coils to carry out the action commanded by the input switch.

It will be apparent from the above that while certain limitations are placed in the operation of the motors, i.e., simultaneous operations of two motors in opposite directions is not permitted, a substantial cost reduction is achieved in the number of relays necessary to provide selective rotation of individual motors in either of two directions.

Having thus described our invention what we claim is:

1. A circuit for controlling a plurality of reversible electric motors comprising
   a source of direct current potential,
   first, second and third conductors,
   first and second motor banks, each bank including a plurality of motors, one side of each motor in said first motor bank connected to said first conductor, one side of each motor in said second motor bank connected to said second conductor,
   a plurality of independently operable select switch means for selectively connecting the other side of respective ones of said plurality of motors in said first or second banks to said third conductor,
   control switch means operable to connect said source across said first and third conductors or said second and third conductors in either of two polarity configurations.

2. The circuit defined in claim 1 wherein said control switch means comprise first, second and third single pole/double throw switch means, said first single pole/double throw switch means operable to connect said third conductor to said first or second conductor, said second and third single pole/double throw switch means operable to connect said source across said first and second conductors in either of two polarity configurations.

3. The circuit defined in claim 1 wherein said control switch means comprise first, second and third single pole/double throw switch means, said first single pole/double throw switch means operable to connect said third conductor to said source or a reference potential, said second and third single pole/double throw switch means connected in series and independently operable to selectively connect said first or second conductors to said source or a reference potential.

4. A circuit for controlling a plurality of reversible electric motors comprising
   a source of direct current potential,
   first, second and third conductors,
   first and second motor banks, each bank including a plurality of motors, one side of each motor in said first motor bank connected to said first conductor, one side of each motor in said second motor bank connected to said second conductor,
   a plurality of independently operable select switch means for selectively connecting the other side of respective ones of said plurality of motors in said first or second banks to said third conductor,
   bank selection switch means for connecting said third conductor to said first or second conductor,
   motor direction control switch means operable to connect said source across said first and second conductors in either of two polarity configurations.

5. A circuit for controlling a plurality of reversible electric motors comprising
   a source of direct current potential,
   first, second and third conductors,
   first and second motor banks, each bank including a plurality of permanent magnet motors, each having a pair of energizing terminals, one terminal of each motor in said first motor bank connected to said first conductor, one terminal of each motor in said second motor bank connected to said second conductor,
   a plurality of single pole/double throw switch means independently operable from a normal position to an actuated position respectively connecting said third conductor to the other terminal of respective ones of said plurality of motors in said first or second banks,
   a single pole/double throw bank selection switch normally connecting said third conductor to one of said first or second conductors and operable to connect said third conductor to the other of said first or second conductors,
   first and second single pole/double throw motor direction control switches normally connecting said first and second conductors to a reference potential and independently operable to connect said source to said first or second conductors.

6. A circuit for controlling a plurality of reversible electric motors comprising
   a source of direct current potential,
   first, second and third conductors,
   first and second motor banks, each bank including a plurality of permanent magnet motors, one side of each motor in said first motor bank connected to said first conductor, one side of each motor in said second motor bank connected to said second conductor,
   a plurality of single pole/double throw switch means for selectively connecting the other side of respective ones of said plurality of motors in said first or second banks to said third conductor,
   first and second motor direction switch means,
   said first switch means operable to connect said third conductor to said source or a reference potential,
   bank selection switch means, said bank selection switch means and said second switch means connected in series and independently operable to selectively connect said first or second conductors to said source or a reference potential.

* * * * *